UNITED STATES PATENT OFFICE.

GEORGE M. ALLERTON, OF NAUGATUCK, CONNECTICUT.

IMPROVEMENT IN WATER-PROOF FABRICS.

Specification forming part of Letters Patent No. 152,451, dated June 30, 1874; application filed June 17, 1874.

*To all whom it may concern:*

Be it known that I, GEO. M. ALLERTON, of Naugatuck, in the county of New Haven and State of Connecticut, have invented certain Improvements in Water-Proof Fabrics, of which the following is a specification:

My invention relates to a new water-proof fabric; and it consists of a woven woolen cloth having one surface covered with a thin film of rubber, as hereinafter described.

To make this new article I take woolen cloth of any suitable variety, according to what the article is to be used for when completed, and coat it with a thin sheet of rubber in the following manner: The rubber is first prepared in the usual manner, well known to those skilled in the art, after which it is passed between rolls until reduced to a thin sheet. I then take the cloth, and also the sheet of rubber, which is kept in a soft and pliable state, and, placing the rubber upon the cloth, pass the two together through between heated rolls under great pressure, by which means the rubber is made to adhere to the cloth, completely covering one surface thereof. In doing this care must be taken to hold the sheet of cloth and the sheet of rubber even and smooth, so that both shall pass evenly through between the rolls, so as to spread the rubber sheet evenly over the entire surface of the cloth on one side. Care must also be taken not to pull the rubber in such a manner as to tear it, as otherwise there will be spaces on the cloth not covered by the rubber. After the rubber has been thus applied to the cloth it is vulcanized in the usual manner, when it is ready for use.

In this way I produce a new water-proof fabric that is specially adapted to making overcoats, capes, caps, and similar articles. By using a woven woolen cloth as the basis or foundation, and applying the rubber on the wrong side, I produce an article, which, while being water-proof, has all the appearance of an ordinary woolen fabric externally. The rubber may be applied in a very thin sheet, thus adding but little to the weight, so that an overcoat made of cloths, such as are ordinarily used for spring and fall overcoats, will be but a little heavier than such coats usually are, and still be impervious to both wind and rain. A garment made of such fabric can be made reversible, and worn either side out, according to the weather and circumstances.

Having thus described my invention, what I claim is—

The herein-described water-proof fabric, consisting of a woolen cloth, having one surface coated with a sheet of rubber, as a new article of manufacture.

GEO. M. ALLERTON.

Witnesses:
B. M. HOTCHKISS,
JOS. S. LEGGETT.